United States Patent [19]
Bertschi

[11] Patent Number: 4,719,554
[45] Date of Patent: Jan. 12, 1988

[54] METHOD FOR PROTECTING TWO STATIC CONVERTERS WITH DIRECT-CURRENT LINK FROM OVERCURRENTS

[75] Inventor: Rolf Bertschi, Zurich, Switzerland
[73] Assignee: BBC Brown Boveri Ltd., Baden, Switzerland
[21] Appl. No.: 877,863
[22] Filed: Jun. 24, 1986
[30] Foreign Application Priority Data
  May 12, 1986 [DE] Fed. Rep. of Germany ....... 3615921
[51] Int. Cl.[4] .............................................. H02H 7/00
[52] U.S. Cl. ....................................... 363/51; 363/54; 363/58
[58] Field of Search ....................... 363/35, 51, 54, 58; 361/100

[56] References Cited

U.S. PATENT DOCUMENTS

| | | | |
|---|---|---|---|
| 3,596,166 | 7/1971 | Faust et al. ......................... | 363/51 X |
| 3,683,264 | 8/1972 | Schieman et al. ................... | 363/58 |
| 3,707,669 | 12/1972 | Kanngiesser et al. ................ | 363/51 |
| 3,848,175 | 11/1974 | Demarest ........................... | 363/54 X |
| 4,279,009 | 7/1981 | Andronov et al. ................. | 363/51 X |
| 4,331,994 | 5/1982 | Wirth ................................ | 361/100 X |
| 4,527,214 | 7/1985 | Hattori et al. ...................... | 363/51 X |
| 4,555,750 | 11/1985 | Matsumara et al. ................ | 363/51 X |
| 4,563,732 | 1/1986 | Ljungqvist et al. ................. | 363/51 X |

OTHER PUBLICATIONS

Brown Boveri Mitteilungen, Baden/Schweiz, Sep. 1978, Band 65, pp. 597–601, (Stand der Technik).

*Primary Examiner*—Patrick R. Salce
*Assistant Examiner*—Marc S. Hoff
*Attorney, Agent, or Firm*—Oblon, Fisher, Spivak, McClelland & Maier

[57] ABSTRACT

The field windings of large generators of hydroelectric power stations which are continuously connected to a three-phase system and are designed to produce large capacitive powers, are fed from a "positive" main static converter, designed for 8 kA, via a field circuit. An anti-parallel "negative" auxiliary static converter designed for 600 A maintains a link current ($i_Z$) of 200 A in a direct-current link with a link choke. To prevent overcurrents, which can be harmful for the link choke and the auxiliary static converter, in the direct-current link due to disturbances such as, for example, a short-circuit in the three-phase system or connection or disconnection of capacitor banks, a free-wheeling residual current is initiated in the direct-current link when the link current ($i_Z$) exceeds a predeterminable first current limit value ($i_{G1}$), corresponding to 120% of the nominal link current, during a minimum period of time of 0.5 ms. The free-wheeling condition is terminated when the link current drops below a second current limit value ($i_{G2}$), corresponding to 10% of the first current limit value. To initiate the free-wheeling condition, normal control signals of a firing pulse regulator for firing angle devices are blocked and a firing pulse generator is started which emits a continuous firing pulse or a chain of short-time firing pulses to the control electrode of that thyristor (T4, T4') of the negative bridge half of the particular static converter which is connected to the same alternating-current phase (U, V, W) as the thyristor (T1, T1') of the positive bridge half which happens to be conducting.

8 Claims, 3 Drawing Figures

4,719,554

METHOD FOR PROTECTING TWO STATIC CONVERTERS WITH DIRECT-CURRENT LINK FROM OVERCURRENTS

BACKGROUND OF THE INVENTION

1. Field of the Invention

This invention relates to a method for protecting two static converters with direct-current link from overcurrents.

2. Discussion of the Background

Prior art methods for protecting two static converters with direct-current link from overcurrents which known from the Swiss house journal: Brown Boveri Reports 9 (1978), pages 598–601. In this journal, a static excitation device comprising fully controlled antiparallel static converters 9 and 11 carrying circulating current, shown in FIG. 1, is provided for exciting a generator 5 of a hydro-electric power station which feeds a three-phase system 1. The two static converters 9 and 11 are fed from the three-phase system 1 via transformers 15 and 17. In accordance with its polarity and rectifier orientation, the static converter 9 supplies a positive exciter current component $I_{(+)}$ and the static converter 11 supplies a negative exciter current component $I_{(-)}$. The exciter current components $I_{(+)}$ and $I_{(-)}$ can be detected by means of current transformers 14 and 16 in the feed lines to the transformers 15 and 17. For reasons of better clarity, only one pair of current transformers 14 and 16 each is drawn in FIG. 1; in fact, current transformers are provided in two feed lines to each of the transformers 15 and 17. The current in the third feed line in each case is the result of the sum of the currents in the two other feed lines. Depending on the voltage at the rotor, one static converter always works in rectifier mode and the other in inverter mode.

A firing pulse regulator 4, described in detail in the abovementioned house journal, is connected at the input to the three-phase system 1 via a voltage transformer 2 and a current transformer 3. At the output, it controls the thyristors T1–T6 in the bridge branches of the static converter 9 via a firing angle device 12 and thyristors T1'–T6' in the bridge branches of the static converter 11 via a firing angle device 13.

The field current $I_f = I_{(+)} - I_{(-)}$ is fed to the exciter winding of the generator 5 via a de-excitation switch 7. A non-linear de-excitation resistance 8, for example of silicon carbide, in series with a short-circuiter 6 which is provided with anti-parallel thyristors, is connected in parallel with the exciter winding of the generator 5.

A current flow path 34 of the "positive" static converter 9 from 5 via a first contact Of 7, then via T6, 15, T1 and a second contact of 7 to 5 is drawn in dashes. A second current flow path 34, drawn in dots, of the "negative" static converter 11 for the exciter current component $I_{(-)}$ leads from 17 via T4', T6, 15, T1, a link choke 10 and T3' back to 17. The link choke 10 is used for decoupling the two current flow paths and direct-current circuits 34 and 35 and for preventing short-circuit compensating currents. The compensating current between the two static converters 9 and 11 is regulated to a minimum; it ensures that both static converters are continuously carrying current and that a reversal from negative to positive exciter current can take place virtually without loss of time. Such a reversal is required especially under transient conditions such as, for example, short-circuits of open-circuit power lines. This makes it possible to prevent false disconnections with overvoltages.

This regulating device guarantees stable operation even with zero excitation and prevents oscillation between the two static converters.

For economic reasons, the link choke 10, which is provided with an iron core, cannot be selected to be of any size. In the case of a disturbance caused, for example, by a short-circuit in the three-phase system 1 or in the case of a fault in the static converter regulation, a link current $i_z$ can rise very rapidly so that the link choke 10 goes into saturation. During this process, the link choke 10 and the "negative" static converter 11 with lower rating can be damaged. Fuses 26, see FIG. 2, in the feed lines to the thyristors T1–T6 and T1'–T6' can become defective. When the link is opened, contacts, not drawn, of a link switch can become welded together. Such overcurrents can also be expected with a correctly operating regulation if overvoltages, out of-balance conditions and voltage distortions occur in the three-phase system 1 as is the case, for example with generators feeding into a disturbed high-voltage direct-current transmission line or if capacitors banks are switched off. In the known method, the generator 5 is disconnected from the three-phase system 1 after a link current has been detected which is too high. The firing pulses are blocked and de-excitation is initiated. Although these measures protect generator and excitation system, the generator is no longer available after the disturbance which, in general, lasts a few tenths of seconds at the most. This outage is particularly undesirable if it affects several machines of a power station.

SUMMARY OF THE INVENTION

Accordingly, one object of this invention is to provide a novel method of preventing dangerous overcurrents in the direct-current link between two static converters.

An advantage of the invention consists in overcurrent damage being prevented on the link choke, on the "negative" static converter of lower rating and on any switching devices in the direct-current link. After freewheeling is initiated by both static converters, the link current slowly decays. No further current passes via transformers which feed the static converters so that no more system reactions are possible either. A generator fed by the "positive" static converter does not need to be disconnected from the three-phase system in case of a failure.

According to an advantageous development of the invention, an increased link current is detected before it becomes dangerous.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a basic diagram of an excitation device according to the invention for a generator with freewheeling circuit drawn in.

Identical signals and objects are provided with the same reference symbols in the figures.

DESCRIPTION OF THE PREFERRED EMBODIMENTS

Figure 1:
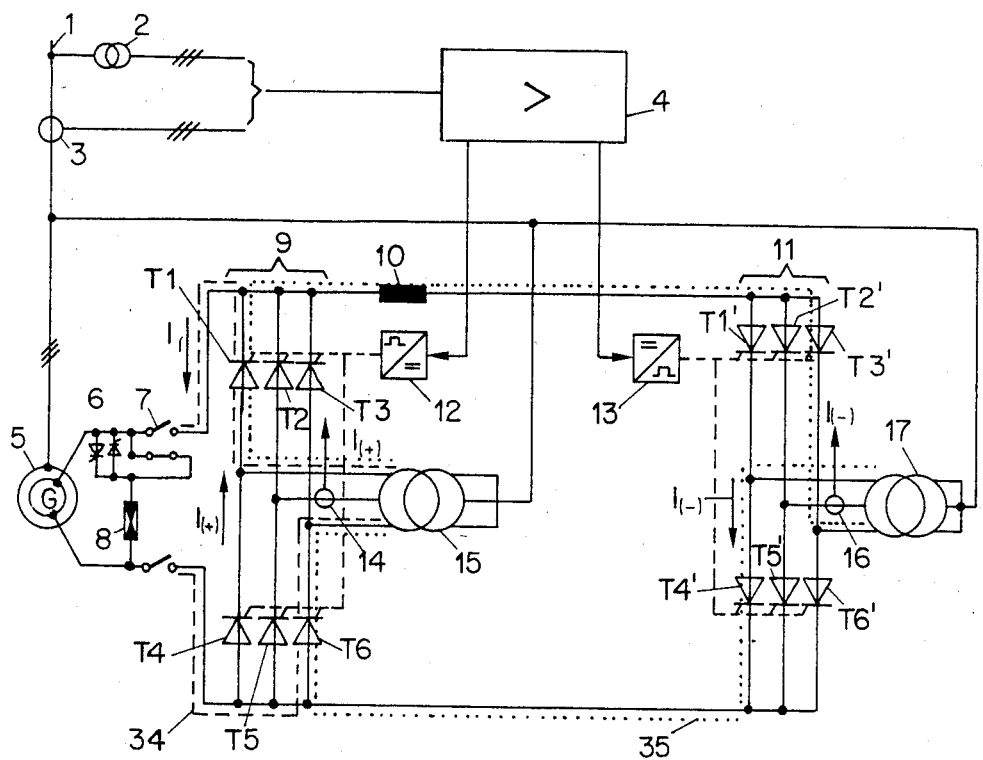
FIG. 1 shows a basic diagram, considered to be part of the prior art, of an excitation device for a generator and represents a normal operating case.
Figure 2:
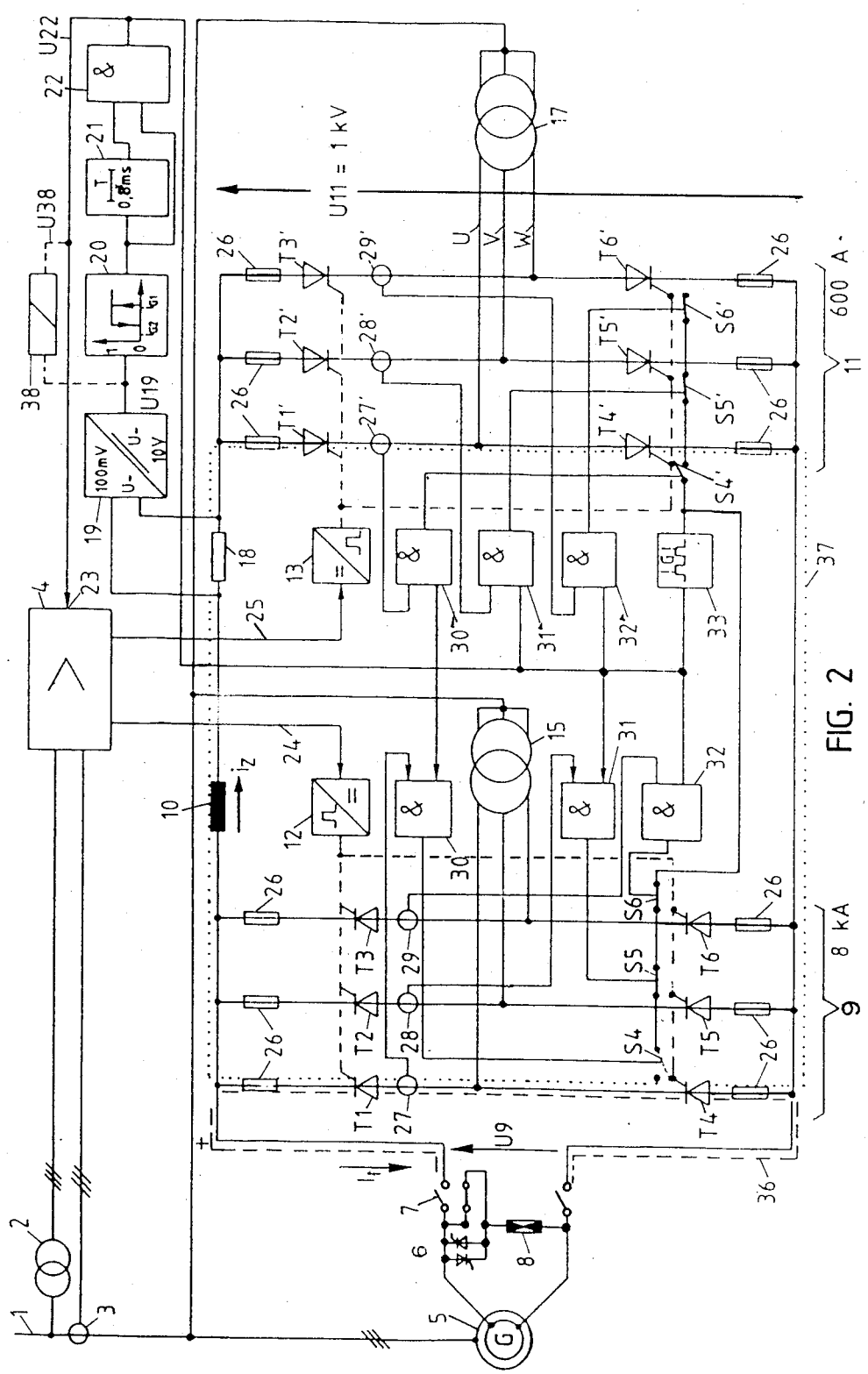

Referring now to the drawings, wherein like reference numerals designate identical or corresponding parts throughout the several views, and more particularly to FIG. 2 thereof, in contrast to the excitation device according to FIG. 1, the excitation device according to FIG. 2 has a shunt or sensing resistor 18 in the current path of the direct-current link. The voltage drop across this sensing resistor 18 is within the range of from 0 mV–100 mV and is a measure of the link current $i_Z$ which is typically within the range of 100 A–600 A, preferably 200 A. The taps of the sensing resistor 18 are connected to the measuring inputs of a direct-voltage converter 19 with direct-current isolation which supplies at its output a voltage signal U19 of 0 V–10 V to a Schmitt trigger 20.

If the voltage signal U19 exceeds a predeterminable first voltage limit value, corresponding to an upper or first current limit value $i_{G1}$, the Schmitt trigger 20 emits at its output a logic "1" signal and otherwise the logic signal "0". When the limit value has been exceeded, the "1" output signal of the Schmitt trigger 20 disappears only when the voltage signal U19 drops below a predeterminable second voltage limit value, corresponding to a lower or second current limit value $i_{G2}$. The first current limit value $i_{G1}$ is within the range from 110%–150% of the nominal link current, preferably within the range from 115%–125% particularly at 120% of the nominal link current. The second current limit value $i_{G2}$ is less than 50% of the first current limit value, preferably less than 25%, particularly = 10% of the first current limit value $I_{G1}$.

The output of the Schmitt trigger 20 is connected, on the one hand, to a first input of an AND section 22 and, on the other hand, over a delay section 21 with predeterminable time delay T to a second input of this AND section 22. The time delay T is within the range from 0.3 ms–1.2 ms, preferable at 0.8 ms. The time delay serves to ensure that short-term overcurrents caused by transient events cannot lead to a termination of normal operation and initiation of free-wheeling. Short-term free-wheeling conditions are harmless for the operation of the generator even if they should be triggered unintentionally.

The output signal U22 of the AND section 22 is fed to a blocking input 23 of the firing pulse regulator 4 where it blocks the output of control signals 24 and 25 to the firing angle devices 12 and 13 in the case of a logical value "1" from U22. At the same time, the output signal U22 is fed to first inputs of AND sections 30–32 and 30'–32' and to the control input of a firing pulse generator 33 which is started synchronously with a "1" signal from U22, generates a chain of short-term firing pulses and stops at the end of the "1" signal from U22 after completion of the complete and last pulse. A firing pulse generator 33 can also be used which generates a continuous firing pulse during the period of the "1" signal from U22.

Instead of the components 20–22 a commercially available adjustable minimum/maximum relay 38 with a response time of 1 ms can also be used which supplies at its output a control or voltage signal U38 and can be connected as indicated in dashes in FIG. 2.

In the positive bridge branches of the static converters 9 and 11, current detectors or current transformers 27–29 and 27'–29' are provided which are effectively connected at the output to second inputs of the AND sections 30–32 and 30'–32'. The outputs of the AND sections 30–32 and 30'–32' are connected to control electronic switches S4–S6 and S4'–S6'. These switches S4–S6 and S4'–S6' are connected, on the one hand, to the control electrodes of thyristors T4–T6 and T4'–T6' and, on the other hand, to the output of the firing pulse generator 33. In the switch position shown, with opened switches S4 and S4' and closed switches S5, S6, S5' and S6', the firing pulse signals pass from the output of the firing pulse generator 33 only to the control electrodes of the thyristors T4 and T4' but not to the control electrodes of the thyristors T5, T6, T5' and T6'.

This switch position results from an overcurrent, lasting at least 0.8 ms, in the direct-current link, with U22="1". The thyristors T1 and T1' were conducting so that the current transformers 27 and 27' transmit a voltage signal to the AND sections 30 and 30'. Since, at the same time, the signal U22="1" is present at these AND sections 30 and 30', their outputs drive the switches S4 and S4' into the position shown. As a result, a free-wheeling circuit 37, drawn in dots, is produced for the link current $i_Z$ by the two static converters 9 and 11. The load current of each static converter is conducted to the rectifiers of a three-phase current phase U or V or W. The output voltage U9 of the static converter 9 and U11 of the static converter 11 becomes 0; but the existing current can continue to flow.

After free-wheeling has taken place, no further rise occurs in the link current $i_Z$. Due to the existing load inductances—field winding of the generator 5 and link choke 10—the currents through a field circuit 36, shown in dashes, and through the free-wheeling circuit 37, shown in dots, decay only slowly. During the normal period of a system disturbance of up to 0.5 s, impressed field currents can flow unimpeded in both directions. Since the static converters 9 and 11 are connected to the associated transformer 15 and 17 only via one three-phase current phase, it is impossible for the three-phase system 1 to influence the static converters and their load circuits.

The magnetic flux in the generator 5 changes relatively little in the short time of the disturbance with a field voltage of 0.

After the disturbance has ended, it is possible to switch back to normal operation without problems, the generator 5 remaining connected to the three-phase system 1 without being switched off. The static converter 11 is first provided with firing pulses corresponding to an inverter limit position. The link current $i_Z$ disappears within about 5 ms. After that, both static converters 9 and 11 are normally released so that a link current $i_Z$ can build up again.

Free-wheeling can be initiated in various ways.

The most rapid method is based on finding out which of the thyristors, for example in the positive (negative) bridge half of the respective static converter 9 or 11 is carrying current. All normal firing pulses are then blocked and a continuous pulse or a chain of pulses is applied to the firing electrodes of that thyristor of the negative (positive) bridge half which is connected to the same three-phase current phase as the thyristor of the positive (negative) bridge half which happens to be conducting.

A simpler solution consists in blocking the normal firing pulses in the positive (negative) bridge half and of applying a continuous pulse or a chain of pulses to any or to all thyristors of the negative (positive) bridge half. In this arrangement, however, it must be expected that the link-current $i_Z$ will still rise further, depending on the time of initiation of free-wheeling.

The static converter 9 is designed for a current intensity of 8 kA and a direct voltage of 1 kV as "positive" main static converter for feeding the field winding of the generator 5. In contrast, the static converter 11 is only designed for a comparatively low current intensity of 600 A and a direct voltage of 1 kV as auxiliary "negative" static converter; it only carries the link current $i_Z$. The voltages U9 and U11 of the two antiparallel, series connected static converters 9 and 11 virtually cancel each other. The link choke 10 limits the compensation currents caused by unequal ripple.

Figure 3:
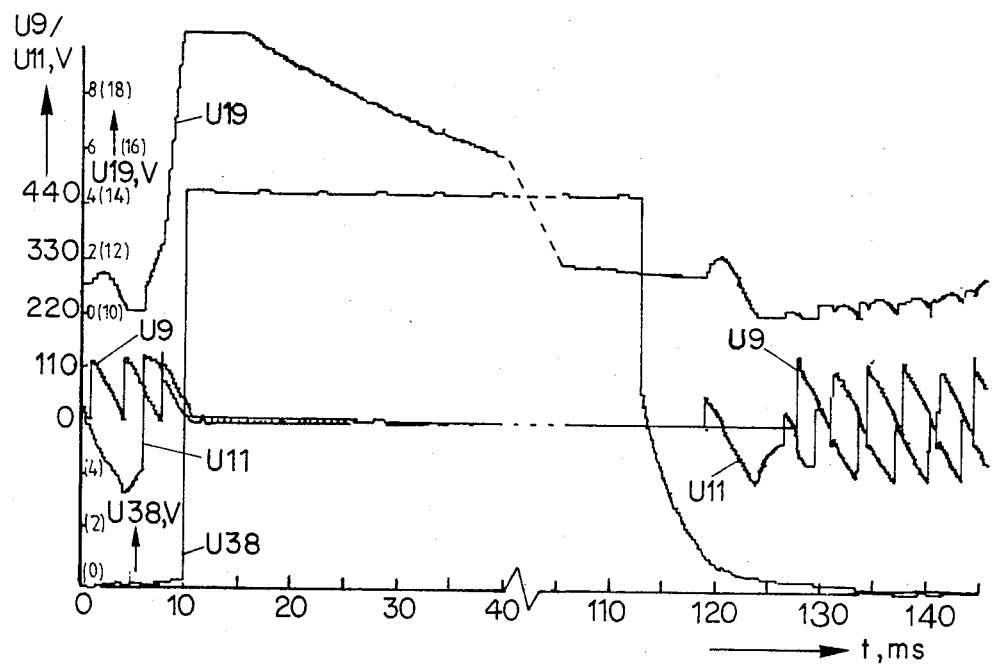
FIG. 3 shows oscillograms recorded on a test system with an artificially produced disturbance.

FIG. 3 shows the variation with time of the voltage signals U9, U11, U19 and U38 in a comparatively small test system with an artificial disturbance. A part section on the ordinate is 110 V for the static converter voltages U9 and U11 and 2 V for the voltage signals U19 and U38, the values for the voltage signal U38 being put in brackets.

In the left-hand part of FIG. 3, the disturbance at time t≃6 ms can be recognized, both U9 and U11 assuming positive voltage values. Shortly thereafter, the link current $i_Z$ and thus the voltage signal U19 rise steeply so that the minimum/maximum relay 38 responds and its output signal U38 suddenly rises to approx. 14.5 V. At time t 11 ms, the static converter voltages U9 and U11 return to 0, corresponding to the free-wheeling state. Shortly thereafter, the link current $i_Z$ and thus also U19 slowly begin to decay.

In the right-hand part of FIG. 3 it can be seen how the link current $i_Z$, cf. U19, builds up again virtually without overshoot after a restart of the "positive" and "negative" static converters 9 and 10 at time t 118 ms.

Naturally, the link current $i_Z$ can be detected, for example, by means of a current transformer instead of by the voltage drop across the sensing resistor 18. The firing pulse generator 33 can also be integrated into the firing angle devices 12, 13 or into the firing pulse regulator 4. The rectifiers which happen to be conducting at the time of the occurrence of the disturbance, can also be detected due to the generation of the control signals 24 and 25 within the firing pulse regulator 4 instead of by current transformers 27-29 and 27'-29'.

As a criterion for resetting to normal operation, for example a circuit, not shown, can be used which monitors the state of balance of the current system voltages U, V, W.

It is important that a free-wheeling condition for both static converters 9 and 11 is produced as rapidly as possible as a function of a predeterminable limit value $i_{G1}$ of the link current $i_Z$ being exceeded and prevents a dangerous rise in current in the direct-current link.

The method is particularly suitable for very large salient-pole machines of hydro-electric power stations which are continuously connected to the three-phase system 1 and are designed to produce high capacitive powers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for protection of two converters with direct-current link carrying a link current, comprising:
   detecting if the link current exceeds a first predeterminable limit value ($i_{G1}$); and
   controlling said two converters when it is detected that said link current exceeds said first predeterminable value ($i_{G1}$) so that said converters operate in a free-wheeling state in which a bridge arm of one bridge half and the bridge arm of the other bridge half connected to the same AC phase in each of the two converters are brought to a current conducting state or maintained in a current conducting state.

2. The method as claimed in claim 1, wherein the free-wheeling state is terminated when the link current ($i_Z$) drops below a predeterminable second current limit value ($i_{G2}$).

3. The method as claimed in claim 2, wherein
   (a) the first current limit value ($i_{G1}$) is within the range from 110%–150% of the nominal link current, and
   (b) the second current limit value ($i_{G2}$) is less than 50% of the first current limit value.

4. The method as claimed in claim 3, wherein
   (a) the first current limit value ($i_{G1}$) is within the range from 115%–125% of the nominal link current, and
   (b) the second current limit value ($i_{G2}$) is less than 25% of the first current limit value.

5. The method as claimed in claims 1, 2, 3 or 4, wherein the free-wheeling state of static converters is initiated when the link current ($i_Z$) exceeding the predeterminable first current limit value $i_{G1}$ lasts for a predeterminable period of time (T) of more than 0.1 ms.

6. The method as claimed in claim 5, wherein the free-wheeling state in said static converters is initiated when the link current ($i_Z$) exceeding the predeterminable first current limit value ($i_{G1}$) lasts for a predeterminable period of time (T) in the range from 0.3 ms–1.2 ms.

7. The method as claimed in claims 1, 2, 3 or 4 wherein:
   (a) the normal control signals for firing angle devices for controlling the rectifiers of the two static converters are blocked as a function of the first current limit value ($i_{G1}$) of the link current ($i_Z$) being exceeded,
   (b) the rectifier, which happens to be conducting, of the positive or negative bridge half of a static converter is determined, and
   (c) the rectifier connected to the same alternating-current phase of the negative or positive bridge half of this static converter is supplied with a continuous firing pulse or a chain of short-time firing pulses during the period of the controlling in the free-wheeling state.

8. A method for protection of two converters with direct-current link carrying a link current, comprising:
   detecting if the link current exceeds a first predeterminable limit value ($i_{G1}$); and
   controlling said two converters when it is detected that said link current exceeds said first predeterminable limit value ($i_{G1}$) so that said converters operate in a free-wheeling state in which, (a) the normal control signals for firing angle devices for controlling the rectifiers of the two static converters are blocked as a function of the limit value ($i_{G1}$) of the link current being exceeded, and (b) all rectifiers of a selected of the negative or positive bridge halves of the two static converters are supplied with a continuous firing pulse or with a chain of short-time firing pulses.

* * * * *